Feb. 13, 1940. W. E. BARNARD 2,190,203
COFFEE CONTAINER
Filed Aug. 5, 1937
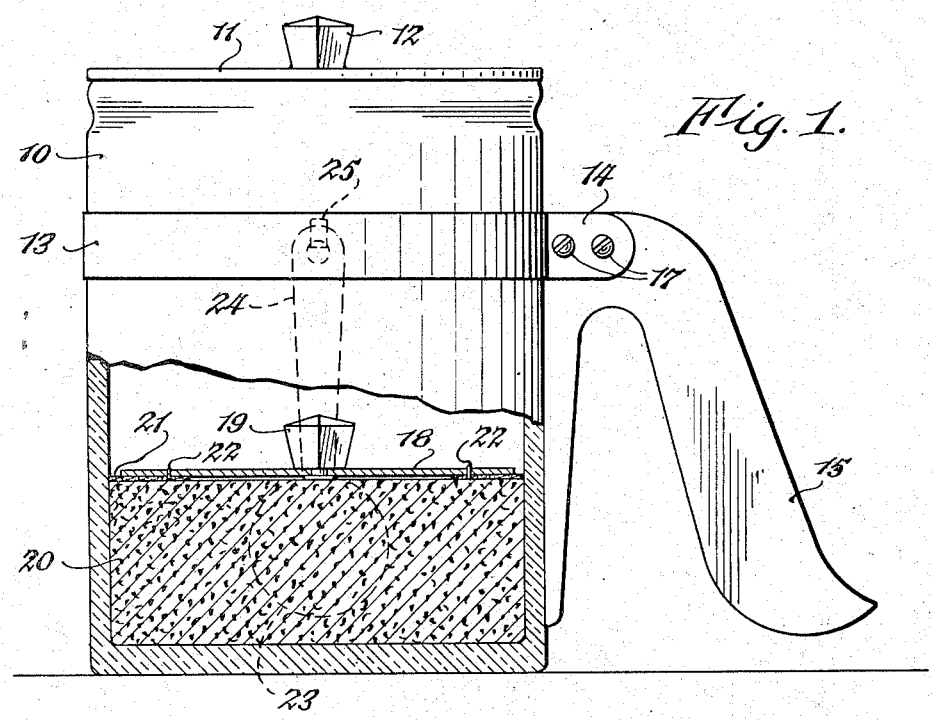
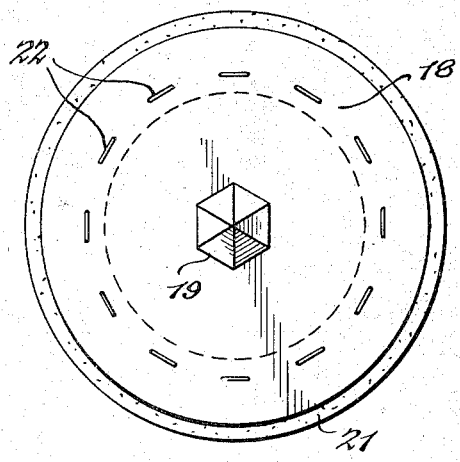
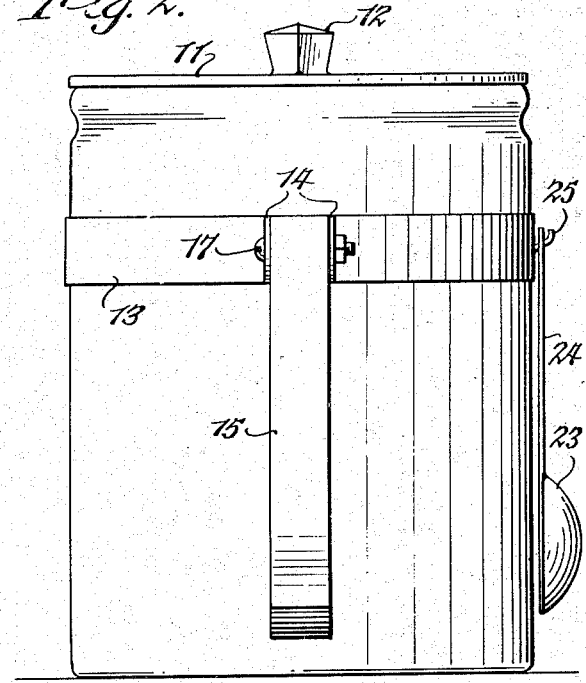
INVENTOR
Walter E. Barnard
BY
Parker, Brockwow & Farmer.
ATTORNEYS Patented Feb. 13, 1940

2,190,203

UNITED STATES PATENT OFFICE 2,190,203

COFFEE CONTAINER

Walter E. Barnard, Wethersfield, Conn.

Application August 5, 1937, Serial No. 157,562

3 Claims. (Cl. 220—93)

This invention relates to the storing of dry, ground, roasted coffee and particularly to the storing of such coffee by the ultimate consumer or general public in a manner such that the coffee may be removed in increments at intervals.

An object of the invention is to provide an improved device for storing dry, ground, roasted coffee in a manner to permit easy access thereto for the removal of the coffee in increments at intervals, with which the flavor, strength, aroma and other desirable characteristics of the coffee may be preserved, and with which the tendency of the coffee to develop undesirable changes in its characteristics, such as occur upon the prolonged exposure of the coffee to air, may be retarded or prevented in a simple and practical manner.

Another object of the invention is to provide an improved and simplified device for the storing by the consumer of dry, ground, roasted coffee in a manner to facilitate the handling of the coffee, and its withdrawal in increments at intervals, and at the same time to restrict the tendency of the coffee to develop undesirable physical characteristics.

Another object of the invention is to provide an improved storage device for preventing objectionable changes in the quality and properties of dry, ground, roasted coffee stored therein, such as would occur upon prolonged exposure of such coffee to air, and which is relatively simple, effective, convenient and inexpensive.

Another object of the invention is to provide an improved method of storing dry, ground, roasted coffee, particularly by the ultimate consumer, by means of which the coffee will largely retain its flavor, strength, aroma and other desirable characteristics, and the tendency of the coffee to develop undesirable changes in its characteristics, such as would occur upon prolonged exposure of the coffee to air, will be retarded or prevented, and which will not objectionably interfere with the withdrawal of increments of the coffee at intervals.

Various other objects and advantages will be apparent from the following description of one embodiment of the invention, and the novel features of the invention will be particularly pointed out hereinafter in connection with the appended claims.

In the accompanying drawing:

Fig. 1 is a front elevation of a storage device constructed in accordance with this invention, and illustrating one embodiment thereof;

Fig. 2 is a side elevation of the same; and

Fig. 3 is a plan of the floating inner seal cover of the device.

In the illustrated embodiment of the invention, I provide a suitable jar or container 10 which may be of any suitable material such as ceramic materials, metal or glass. The side and bottom walls of this jar 10 are imperforate, and the jar is preferably provided at its upper end with a large mouth or open end which is normally closed by a removable cover 11, preferably imperforate, having a handle 12 by which it may be removed or replaced to enable access to be had to the interior of the jar. A flexible band 13 surrounds the jar 10 intermediate of its height, and the ends of this band are provided with laterally extending flanges 14 which are brought against opposite sides of a handle block 15. The block 15 has an end face 16 abutting against the side wall of the jar 10 when the handle is disposed between the flanges 14.

A pair of bolts 17 connect the flanges 14 to one another and pass through openings in the handle 15, so that by drawing the flanges 14 against opposite side faces of the handle 15, the band 13 will be tightened on and firmly grip the jar 10, and thereby clamp the handle 15 firmly to the jar 10. The handle 15, when so clamped, extends downwardly and obliquely away from the jar 10, so as to be easily grasped by one's hand, and thus enable the jar 10 to be lifted and carried about or otherwise manipulated. The band 13 may be of any suitable flexible material, but is preferably made of metal, and a non-rusting or non-corroding metal such as Monel metal is particularly suited for this purpose.

Within the jar, I dispose an imperforate floating plate or element 18 which preferably has substantial weight, and this plate is provided on its upper face with a handle or button 19 by which it may be manipulated. The plate 18 is preferably largely rigid and its peripheral marginal portion extends into close proximity to or fits the inner side wall of said container or jar. A mass or body 20 of dry, roasted coffee, usually ground, is first placed in the jar 10, and the plate 18 then placed in the jar so as to rest upon the upper surface of this body of coffee, and by reason of the fact that the body of coffee is formed of dry, loose particles, the particles tend to maintain an approximately flat level at the top, particularly if the jar is vibrated, jarred or shook to any extent such as would be likely to happen in moving the jar. The imperforate plate 18 by resting flat upon and being supported by the body of coffee will effectively prevent the movement of air from the upper part of the jar into the mass or body of coffee.

It is recognized that dry, ground, roasted coffee loses its flavor, strength, aroma and other desirable characteristics upon prolonged exposure to free air, and that in the presence of free air such coffee tends to develop undesirable flavors and characteristics which produce headaches or other undesirable effects upon the consumer. This undesirable development in the coffee is believed to be due to the action of the air in turning the oils of the coffee slightly rancid. Heretofore, attempts have been made to avoid any changes in roasted coffee by vacuum packing of the coffee in sealed containers, or by insuring rapid delivery of the freshly roasted and ground coffee to the consumer, but both of these methods are open to the objection that if the coffee is not quickly used by the consumer, the undesirable characteristics in the coffee develop and there is a noticeable loss of strength, flavor, aroma and other desirable characteristics through exposure to free air after the coffee is received and opened by the consumer.

Through the use of this container or device by the consumer, the dry coffee may be kept in substantially the condition in which it is received for relatively long periods of time, even though portions or increments are removed for use from time to time. When one desires to withdraw a small quantity of the coffee for use in making a beverage, it is merely necessary to remove the cover 11, lift the plate 18, remove the desired quantity of coffee, replace the plate 18 on the upper surface of the remaining and diminishing quantity or body of dry coffee in the jar 10, and then replace the cover 11. With the cover 11 in place, the air in the jar 10 will be more or less static or quiescent, and the plate 18 prevents the movement of any substantial amount of the air from the upper part of the jar 10 downwardly into and through the mass of coffee in the bottom of the jar.

While of course a small amount of free air will be found between the particles of coffee in the lower part of the container and beneath the plate 18, there will be little or no movement of such air and thus there will be little opportunity for any substantial change in the characteristics of the coffee so stored. The loss of volatile ingredients of the coffee which account to some extent for its strength, flavor and aroma will thus be largely prevented, and by so restricting the circulation of air through the mass of coffee, the tendency of the coffee to develop rancidity or other undesirable characteristics will be retarded or largely prevented.

The plate 18 may be made of any suitable material, but it is preferably fairly rigid and of appreciable weight so as to have some tendency to compact the remaining body of coffee in the jar after some has been removed, and to facilitate its manipulation when removing it or replacing it. While the stiff portion of the plate may be carried into close proximity to the inner side wall of the container, I prefer to have the plate fit rather closely to the inner side wall of the container and for this purpose I have found it advantageous to provide an imperforate, flexible, peripheral or marginal area on the plate 18 which abuts or fits snugly against the inner side wall of the container or jar 10, so as to form a more effective seal between the periphery of the plate 18 and the inner wall of the jar or container 10.

For example, the body of the plate 18 may be made of any suitable, relatively stiff material such as sheet cardboard or metal, molded resins or other suitable material, and an imperforate sheet or disk 21 of flexible material is secured to the under face or the rigid portion of the plate 18 in any suitable manner, such as by staples 22 which pass between the rigid portion of the plate 18 and the disk or sheet 21. In such case, the rigid portion of the plate 18 may be made somewhat smaller than the inner diameter of the jar or container 10 and the flexible disk 21, which is secured to the under face of the rigid portion of the plate 18, is made to fit snugly against the inner side wall of the container or jar 10. Because of the flexibility of this disk 21, it may be made very slightly larger than the inner cross sectional area of the jar or container 10, so as to flex and wipe along the side walls of the container as the plate 18 is lifted or descends with the remaining and diminishing body of coffee in the container.

For example, the disk 21 may be made of sheet felt, paper or other suitable material, but the felt is particularly desirable as it conforms freely to the minor irregularities of the inner side wall of the container or jar 10. By reason of the frictional contact between the flexible periphery of the plate 18 and the inner side wall of the jar or container, a very effective seal is obtained which is adequate to restrict or prevent the movement of free air from the upper part of the jar or container into the body or mass of the coffee stored in the lower part thereof and upon which the plate or member 18 is floatingly supported.

If desired, a measuring spoon 23, having a handle 24, may be hung upon a pin or hook 25 provided on the band 13, as shown, or the spoon 23 may be placed in the jar or container 10 and resting upon the upper face of the plate or member 18 which rests upon and descends with the mass or body 20 of the dry, roasted coffee.

It will be obvious that various changes in the materials and details, which have been herein described and illustrated in order to explain the nature of the invention, may be made by those skilled in the art within the principle and scope of the invention, as expressed in the appended claims.

I claim:

1. In a container for coffee and the like, in which a removable follower rests upon and is supported by a loose body of coffee or the like within a chamber of a container, that improvement in the follower which comprises an imperforate member with a relatively flat underface, of relatively rigid material and of materially smaller diameter than the diameter of the chamber of said container in which it rides but extending across the major portion of said chamber, so as to rise and fall freely in said chamber and be freely tiltable, without binding, therein into different substantial angles of inclination in said chamber, and a relatively thin, imperforate flange carried by said member and extending outwardly therefrom to increase the effective breadth of the follower and form an imperforate enlargement of said member, said flange being of flexible, somewhat resilient material which has an inherent tendency, when released after flexing, to project itself straight out in the same direction from the margin of said member and when so released is of a size slightly larger than said chamber so as to engage against and wipe along the side walls of said chamber around its entire periphery and with a minimum of frictional resistance as the follower rises and falls in the chamber, and to also lie in close proximity to the side walls of said chamber when the follower is tilted in said chamber into different inclinations in seating upon inclined upper faces of said body of coffee or the like in said chamber.

2. An improved enclosure for coffee and the like, which comprises a container having therein a chamber in which a loose body of coffee or the like may be stored and from which coffee may be removed through the top in increments at intervals, and an imperforate follower within said chamber and resting upon the body of coffee therein, and formed of a relatively rigid, imperforate body portion with a relatively flat underface, said body portion being materially smaller in diameter and face area than the diameter and cross sectional area of said chamber, but extending across the major portion of said chamber so as to rise and fall freely in said chamber and be freely tiltable into different substantial angles of inclination in said chamber without binding upon the walls of the chamber, and a relatively thin, imperforate flange extending outwardly from the marginal edge of said body portion in a direction approximately parallel to said flat face so as to increase the effective diameter and face area of the follower over that provided by the body portion, said flange being of flexible, somewhat resilient material which has an inherent tendency to project itself in a direction straight out from the margin of the body portion when released after flexing, and of such maximum shape and size when so released as to engage snugly against and wipe along the side walls of said chamber with a minimum of frictional resistance as the follower rises and falls in the chamber and to also lie in contact with the side walls of the chamber when the follower is tilted in said chamber into different inclinations as it seats itself upon various inclined upper faces of said body of coffee or the like in said chamber, whereby said follower when in position substantially prevents circulation of air therepast between the upper part of said chamber and said body of coffee or the like, whether the upper surface of said body of coffee is level or in different inclinations in said chamber, and offers such minimum frictional resistance on the side walls of the container as to fall freely on the body of coffee in the container whenever placed in said container and released.

3. An improved enclosure for coffee and the like, which comprises a container having therein a chamber in which a loose body of coffee or the like may be stored and from which coffee may be removed through the top in increments at intervals, and an imperforate follower within said chamber and resting upon the body of coffee therein, and formed of an imperforate plate-like, relatively rigid disc having a relatively flat lower face and a handle projecting upwardly from its upper face, said disc having a size substantially less than the cross sectional area of said chamber, but extending across the major portion of said chamber, so as to be freely tiltable, without binding, into different inclined positions across said chamber, and a relatively thin, normally flat, imperforate disc of easily flexible, somewhat resilient material carried by and extending approximately straight out radially of said rigid disc from the peripheral margin thereof, so as to form a flexible, marginal enlargement of said rigid disc which has an inherent tendency when flexed and released to project itself straight out from the margin of said rigid disc as a flange which is approximately parallel to said relatively flat face, the outside diameter of said flexible flange being slightly greater than the inside diameter of said chamber, whereby when said follower is placed in said chamber and released, it will fall by gravity until it rests flat upon said body of coffee in said chamber, said flange will engage with, be flexed slightly by, and will wipe alone the side walls of said chamber with a minimum of frictional resistance, and will maintain contact between the follower margin and the side walls of said chamber when the follower is level in said chamber on said body of coffee as well as when inclined in said chamber by reason of an inclined upper surface of said body of coffee.

WALTER E. BARNARD.